Aug. 14, 1923.

H. ROSENBERG

SCREW

Filed Jan. 18, 1917

Inventor
Heyman Rosenberg.
By his Attorney
Maurice Bloch

Patented Aug. 14, 1923.

1,465,148

UNITED STATES PATENT OFFICE.

HEYMAN ROSENBERG, OF NEW YORK, N. Y.

SCREW.

Application filed January 18, 1917. Serial No. 143,025.

*To all whom it may concern:*

Be it known that I, HEYMAN ROSENBERG, a citizen of the United States of America, residing at New York city, county and State of New York, have invented certain new and useful Improvements in Screws, of which the following is a full, clear, and exact description.

This invention relates to improvements in screws, and relates particularly to a special form of thread arranged to readily cut into metal plates, hard wood or the like and to prevent the backing off of the screw, by jarring, after it has been screwed home.

In order to completely carry out my invention the screws which are made in accordance with my improvement are hardened in order that the threads thereof will become a cutting element, whereby the insertion of the screw into wood or metal will be greatly facilitated due to the fact that the threads themselves are virtually transformed into teeth or cutters by being cut away at intervals in a novel manner as will be presently explained.

In view of the fact that the threads of the screw are recessed to form cutting edges and afterwards hardened, I am able to cause the screw to eat its way into metal with a minimum amount of effort.

Figure 1:
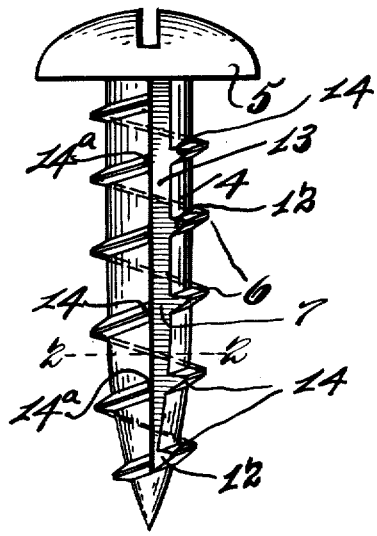
Figure 2:
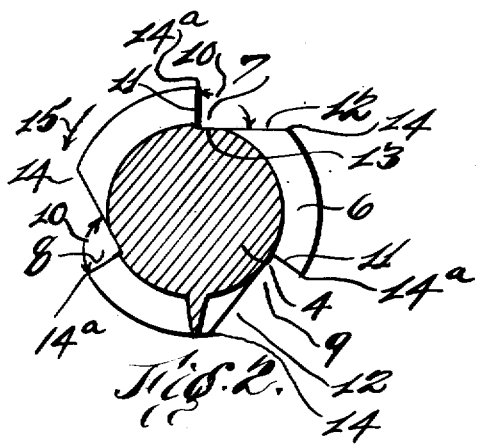
Figure 3:
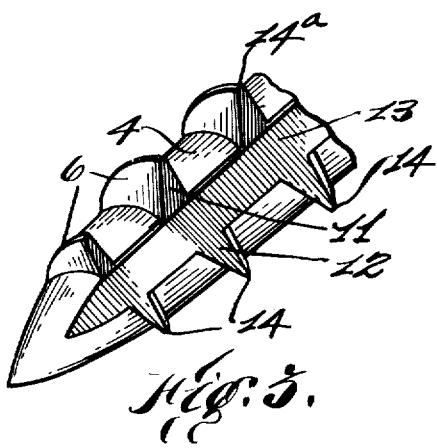

I will now proceed to describe my invention in detail, the essential features of which will be summarized in the appended claims, reference being had to the accompanying drawing, forming part hereof; wherein Fig. 1 is a side view of a screw formed in accordance with my improvement;

Fig. 2 is a cross sectional view thereof, the section being taken on a line 2—2 in Fig. 1; and Fig. 3 is a perspective view of the pointed end of the screw, illustrating the cut away portion of the threads.

In the accompanying drawing, Fig. 1 illustrates a screw consisting of a shank 4 having a head 5 and threads 6. In forming my improved screw I cut away the threads 6, at 7, 8 and 9, the cut away portions of the threads being in alinement longitudinally of the shank. To form cutting edges, or cutters, the cut away portions of the teeth are preferably right angular in shape; in other words, the angle 10 of each cut away portion is approximately 90 degrees, the wall 11 being radially disposed, and the wall 12 being tangential to the shank 4, and preferably longer than the wall 11, the walls 12 being connected by flat portions 13, the said walls 12 and flat portions 13 constituting a table. After the threads 6 have been cut away as above described, the screw is hardened by a special process which renders it extremely hard, so much so that the edges 14 become cutting edges when the screw is rotated in the direction of the arrow 15. After the screw has been inserted, and should the screw start to back off, the edges 14ª of the cut away portions will dig into the material, whether wood or metal, and prevent the premature rotation of the screw. The gap between the edges 14 and 14ª is extensive enough to permit of the expansion of the material, into which the screw is inserted, and hence the edges or points 14ª will engage that portion of the material which has, by its expansion, protruded into said gap. When the screw is being driven in, the material into which it is inserted, will be compressed slightly and hence if a gap is provided which is large or extensive enough, that portion of the material adjacent the gaps will tend to expand and assume its natural condition, thus providing sufficient material for the edges 14ª to eat into. To permit of the expansion of the material, it is necessary to provide a comparatively large gap in the threads, as a short gap would be bridged by the body of the material, especially wood, and would not expand. I find in practice that a gap of approximately 90 degrees is most effective for this purpose. It will be seen that with the threads cut away as shown (Figs. 1 and 3) an elongated flat table portion is provided along substantially the entire length of the shank of the screw, with contiguous flat side walls 11 produced by the cut away threads and projecting outwardly from said table portion at an angle thereto.

What I claim is:

1. A screw-thread fastening having a body and thread substantially the same in contour as a conventional wood screw, the thread being hardened sufficiently for entering into metal such as ordinary soft iron or soft steel substantially without injury to the threads.

2. A screw comprising a shank and thread substantially of the form of a conventional wood screw, a portion of the thread and shank being cut away to provide a locking notch and the thread being hardened sufficiently for cutting metal.

3. A screw having hardened threads with cut away portions forming hardened cutting edges, the body and thread of the screw substantially conforming in proportions and contour to those of the conventional wood screw but the thread extending substantially to the head of the screw.

Signed at New York city, N. Y. this 8 day of January, 1917.

HEYMAN ROSENBERG.

Witnesses:
MAURICE BLOCK,
EDWARD A. JARVIS.

DISCLAIMER 1,465,148.—*Heyman Rosenberg*, New York, N. Y. SCREW. Patent dated August 14, 1923. Disclaimer filed March 28, 1932, by the patentee and the exclusive licensee, *Parker-Kalon Corporation*.

Hereby enter their disclaimer of said claim 1 of said United States Letters Patent No. 1,465,148, which claim is in the following words, to wit:

"1. A screw-thread fastening having a body and thread substantially the same in contour as a conventional wood screw, the thread being hardened sufficiently for entering into metal such as ordinary soft iron or soft steel substantially without injury to the threads."

[*Official Gazette April 19, 1932*]